United States Patent [19]
Linhart

[11] Patent Number: 5,576,505
[45] Date of Patent: Nov. 19, 1996

[54] MUSIC PROMPTER FOR INDICATING NOTE/CHORD CHANGES TO DEVELOPMENTALLY DISABLED INDIVIDUALS OR ORCHESTRAS

[75] Inventor: Gair Linhart, 34 Calle de Centr Sur 26, La Joya, N.M., La Joya, N.M. 87028

[73] Assignee: Gair Linhart, La Joya, N.M.

[21] Appl. No.: 287,865

[22] Filed: Aug. 9, 1994

[51] Int. Cl.[6] .................................................. G09B 15/02
[52] U.S. Cl. ............................................................ 84/477 R
[58] Field of Search ........................... 84/470 R, 477 R, 84/478, 482, 485 R, 464 A

[56] References Cited

U.S. PATENT DOCUMENTS

| | | |
|---|---|---|
| 667,541 | 4/1901 | Loring . |
| 1,324,274 | 1/1919 | Shantz ........................ 84/150 |
| 1,324,275 | 2/1919 | Shantz ........................ 84/150 |
| 1,324,276 | 4/1919 | Shantz ........................ 84/48 |
| 1,324,277 | 9/1919 | Shantz ........................ 84/150 |
| 1,613,400 | 2/1927 | McAleavey .................. 84/477 |
| 2,727,424 | 1/1955 | Issaacson .................... 84/477 |
| 2,897,712 | 12/1959 | Merchant ..................... 84/477 |
| 3,420,135 | 3/1969 | Wolf ............................ 84/478 |
| 3,460,426 | 4/1969 | Jensen ......................... 84/478 |
| 3,552,256 | 4/1971 | Soanes et al. ............... 84/478 |
| 3,610,086 | 11/1971 | Decuier ....................... 84/470 |
| 3,720,128 | 3/1973 | Frank .......................... 84/94 |
| 3,744,366 | 7/1973 | Del Castillo ................. 84/478 |
| 3,784,717 | 1/1974 | Eisatiu et al. ................ 84/470 |
| 3,837,256 | 2/1974 | Gullicusson ................. 84/478 |
| 3,881,390 | 2/1975 | Gullicusson ................. 84/478 |
| 3,895,555 | 11/1975 | Peterson ...................... 84/470 |
| 3,958,487 | 11/1976 | Goldman ..................... 84/478 |
| 4,040,324 | 5/1977 | Green .......................... 84/478 |
| 4,061,072 | 4/1977 | del Castillo ................. 84/478 |
| 4,314,449 | 3/1982 | Olsen .......................... 84/485 R |
| 4,378,720 | 2/1983 | Sugiura et al. .............. 84/1.03 |
| 4,694,723 | 11/1987 | Shinohara et al. .......... 84/1.03 |
| 5,040,447 | 1/1991 | Murata et al. ............... 84/612 |
| 5,252,772 | 4/1993 | Wright ........................ 84/18 |
| 5,266,735 | 3/1993 | Shaffer ........................ 84/609 |
| 5,394,784 | 3/1995 | Pierce et al. ................. 84/478 X |

OTHER PUBLICATIONS

Yamaha Clavinova (Please see Brochure included with References).

*Primary Examiner*—Patrick J. Stanzione

[57] ABSTRACT

A decentralized, expandable prompter device for special musicians and orchestras consists of a prompter control box (1) manned by a teacher/operator who activates one of three momentary switches (2a, 2b, 2c) to light corresponding L.E.D.'s (6a, 6b, 6c) attached with velcro proximate to the corresponding keys/frets of one or more instruments up to a maximum of 10, thus prompting the special musician to play that note.

1 Claim, 2 Drawing Sheets

STRINGED INSTRUMENT WITH OPEN TUNING

MUSIC PROMPTER FOR INDICATING NOTE/CHORD CHANGES TO DEVELOPMENTALLY DISABLED INDIVIDUALS OR ORCHESTRAS

BACKGROUND—FIELD OF INVENTION

This invention relates to music indicators, specifically visual devices responding to movement of keys, directing their movement or showing note relationships.

BACKGROUND—DESCRIPTION OF PRIOR ART

Indicators, commonly in the form of lights, have previously been used to assist and accelerate the musical learning process.

The most popular indicators are those which form an integral part of a musical instrument in a configuration enabling an individual to instruct himself in the playing of that single instrument. In this case, control means are required to activate the lights in a predetermined sequence to indicate which keys the student is to press. Early control means were represented for example in U.S. Pat. No. 2,727,424 by a configuration in which a punched tune card was inserted into a xylophone, and via the contacts of an incorporated terminal board would ignite lamps adjacent to the bars of the instrument in the sequence indicated by the tune card. Technological developments have since produced a wide range of variations on this theme, most of which incorporate digital/analog conversion devices and storage/processing means which are incorporated into the instrument, such as in the case of the Yamaha Clavinova, a computerized keyboard which is used with a set of diskettes on which musical pieces are stored. An alternative version of this arrangement is known for example in U.S. Pat. No. 5,266,735, which describes a computerized music training system for a stringed rather than keyed instrument.

On the other hand, non-integral indicators are known in which an instructor utilizes a keyboard and/or other control means to signal to one or more students at respective instrument stations to effect particular corresponding note changes on their instruments. An early form of this configuration is represented for example in U.S. Pat. No. 1,613,400 by a silent instructor keyboard which connects to a student piano such that when the instructor depresses a key on his silent keyboard, a light is illuminated over a particular key on the piano, thus indicating to the student player which key to press. A teaching device is also known (U.S. Pat. No. 3,958,487) which consists of a compact housing containing a control means, and an indicating means which includes light emitting elements, such device being mountable on any single keyboard or multistringed instrument. An indicating head (U.S. Pat. No. 3,744,366) is also known which is based on a similar principle and which rests upon the keyboard.

As described above, a plurality of music instructional devices are available for many different purposes; however, there is none specifically tailored to the needs of special orchestras. Developmentally disabled student musicians are psychologically equipped to handle only a certain limited number of notes, and programs aimed at teaching these people to play musical instruments are generally not well-funded or well-staffed. Therefore, there is need for a teaching device which in its simplicity, inexpensiveness and flexibility will satisfy this demand. The above types of indicators are unsuitable for one or more of the following reasons:

(a) The student is being prompted, not by a person, but rather by a mechanical or recorded data source. This is obviously problematic in the case of the developmentally disabled, who need personal supervision.

(b) There are too many lights, notes and options, thus confusing the special musician, even if a simple piece of music could be found for him.

(c) The level of technological sophistication is much more evolved than is needed for the purpose, and requires study on the part of the operator or instructor.

(d) The cost resulting from this technological sophistication is beyond the means of most special education facilities.

(e) The device is too large, unwieldy and immobile for use in an active educational setting.

(f) The device is intended to work only with instruments of a certain type, size and scale.

(g) The device is intended to work with only one instrument.

OBJECTS AND ADVANTAGES

Accordingly, the object of this invention is an indicator which satisfies the needs of developmentally disabled individuals or orchestras by circumventing the above obstacles. The Linhart Music Prompter accomplishes this with the following advantages:

(a) The Prompter is operated by an individual working remotely from the developmentally disabled student musician, thus simultaneously conferring the needed human element to the special learning process, and enabling the student to enjoy a feeling of independent accomplishment.

(b) The Prompter can be ideally configured for the three most commonly encountered notes or chords (C, F and G), in the key of C, which allows a wide range of choice in musical pieces, while at the same time keeping the options manageable for special musicians. It can also be used with keyboards which have pre-programmed rhythm accompaniments; such an instrument may be used as the rhythmic lead instrument in an ensemble of various instruments.

(c) The Prompter is so simple in design and concept that it can be operated with little effort by virtually anybody, thus according untrained staff members a great measure of freedom in handling and directing their special musicians, and enabling easy repair or modification by a minimally skilled person.

(d) The cost of the Prompter is exponentially lower than that of anything related on the market.

(e) The Prompter can be transported anywhere with great ease.

(f) The Prompter is adaptable to virtually any keyboard, xylophone or open-tuned stringed instrument, no matter what its type, size or scale.

(g) The Prompter can be speedily configured to work with any desired number or combination of instruments, up to a maximum of ten.

DRAWING FIGURES

Figure 1:
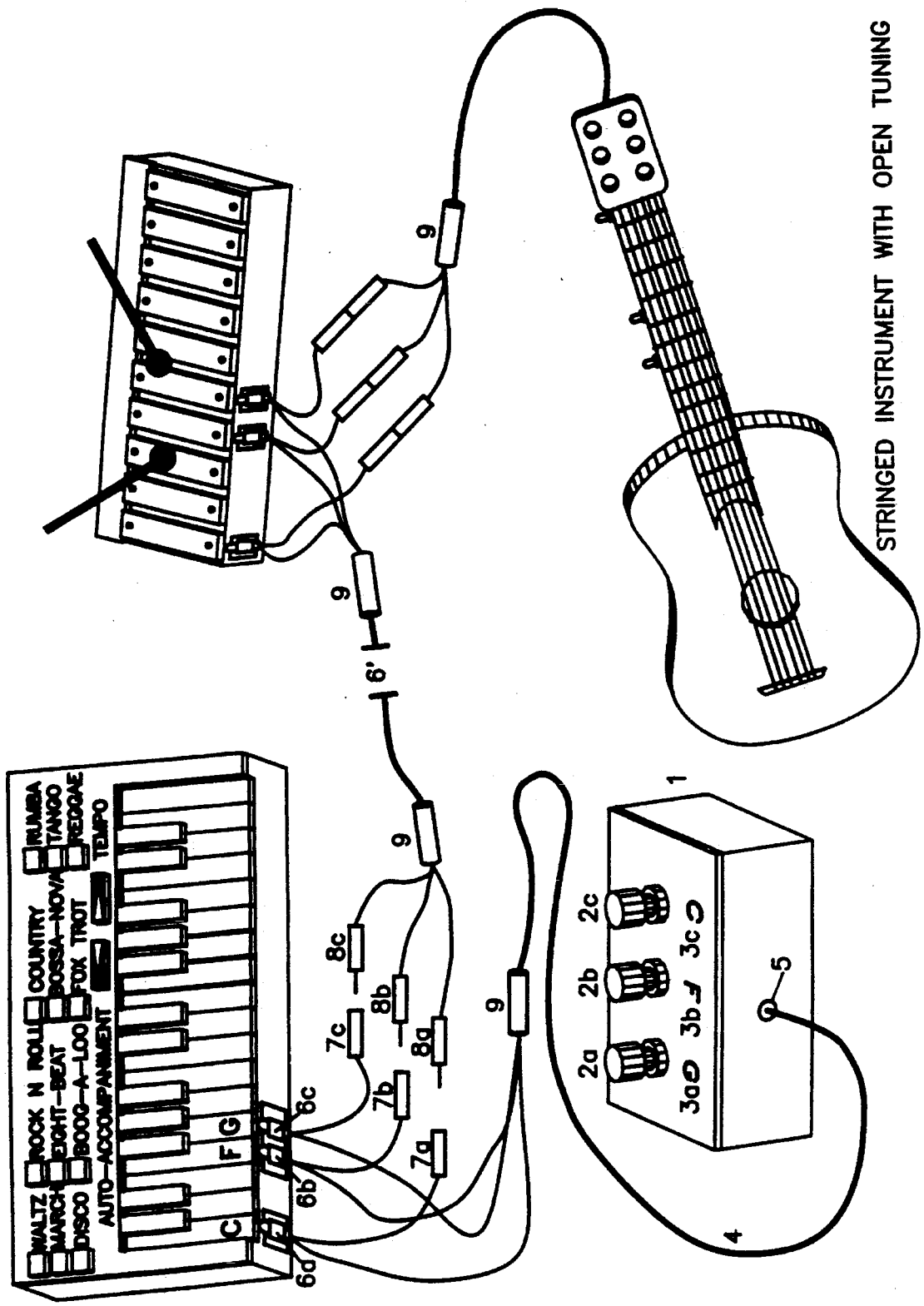
FIG. 1 shows a preferred embodiment of the Linhart Music Prompter.
Figure 2:
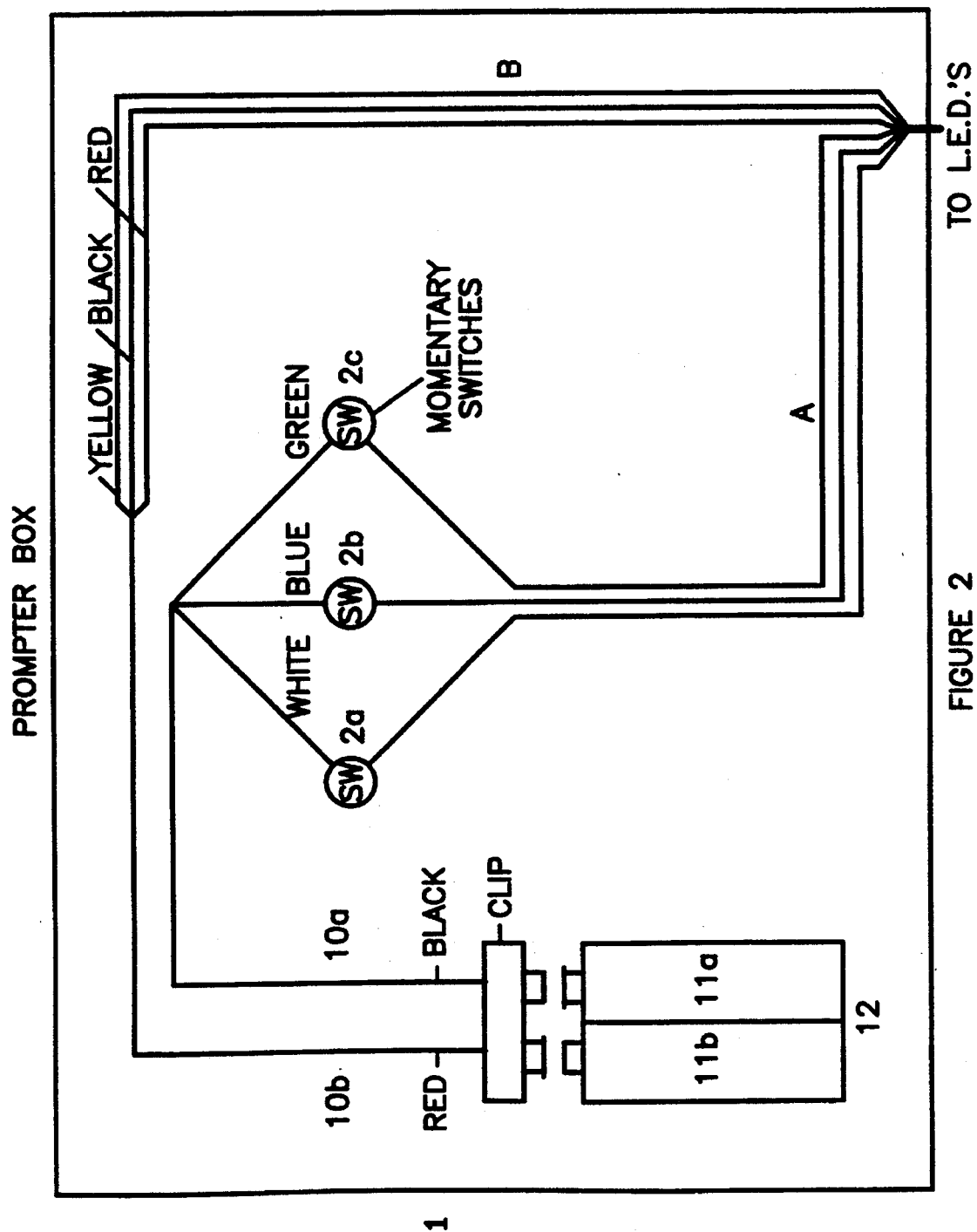
FIG. 2 shows a diagram of the control box and interior wiring scheme.

DESCRIPTION—FIGS. 1 and 2

A preferred embodiment of the Linhart Music Prompter is shown in FIG. 1. Prompter control box 1 is a 2½"×1½" plastic case with three momentary switches 2a, 2b, 2c, proximate to which three note indicator letters 3a, 3b, 3c are affixed. Conductor cable 4, optimally six feet, extends from control box 1 via drilled aperture 5 to three standard variously colored light emitting diodes (L.E.D.'s) 6a, 6b, 6c which attach with velcro strips proximate to the corresponding keys. In-line connectors 7a, 7b, 7c accommodate correspondingly inserted mini-jacks 8a, 8b, 8c which may then be used to chain extra L.E.D. extensions to control box 1, thus enabling additional instruments to be added to the prompter device. Adjustable collars 9 allow appropriate spacing of LEDs and mini-jacks.

FIG. 2 shows a schematic diagram of prompter control box 1. Conductor cable 4, preferably 24 gauge, is a compound cable composed of six smaller conductor wires which, once inside the box, split into two bundles of 3. Bundle A is composed of variously colored wires, in this embodiment white, blue and green wires, which connect respectively to momentary switches 2a, 2b, 2c, and then lead into 2" preferably black wire 10a which extends via clip 13 from the negative pole of AA battery 11a in battery holder 12. The other bundle, Bundle B, preferably composed of variously colored wires, in this embodiment yellow, black and red wires, leads directly to 2" preferably red wire lead 10b extending via clip 13 from the positive pole of AA battery 11b in battery holder 12.

The Linhart Music Prompter is operated by pressing the button corresponding to the desired note. This causes the indicator light(s), each of which is removably attached with velcro to the corresponding keys or fret positions, to flash, thus prompting the special musician to press that key or the strings over that fret.

SUMMARY, RAMIFICATIONS AND SCOPE

The Linhart Music Prompter, operated by an individual working remotely from the developmentally disabled student musician, can be configured for the three most commonly encountered notes or chords (for example, C, F and G, in the key of C) to allow special players a wide range of choice in musical pieces. It is a device so simple that it can be operated, maintained and repaired with little effort by virtually anybody, and is so inexpensive that financial considerations which prevent therapists and institutions from purchasing the complex computerized systems need not be a problem. It is portable, adaptable to virtually any kind of keyboard or open-tuned stringed instrument, and can be expanded via chained conductors to include up to 10 instruments. Clearly, in this age of educational systems which are beyond the technical and economic means of many people, this is a device and method which fill a particular and suitable niche.

I claim:

1. A decentralized, expandable prompter device for special musicians and orchestras, comprising:
   a) prompter control box containing three battery-powered momentary switches;
   b) conductor cable connecting said prompter control box to variously colored light emitting diodes (L.E.D.'s);
   c) velcro strips for holding said light emitting diodes (L.E.D.'s) proximate to the corresponding keys or frets of up to 10 instruments;
   d) note indicator letters affixed to said control box; and
   e) in-one connectors, downstream from said light emitting diodes (L.E.D's), which optionally accommodate mini-jacks which connect additional extensions to said control box, thereby making it possible to prompt extra instruments.

* * * * *